Oct. 10, 1950 W. R. POLYE 2,525,179

ELECTRIC RESISTOR CONTROL DEVICE

Filed Feb. 18, 1946 2 Sheets-Sheet 1

INVENTOR
W. R. POLYE
BY
[signature]
ATTORNEY

INVENTOR

W. R. POLYE

BY [signature]

ATTORNEY

Patented Oct. 10, 1950 2,525,179

UNITED STATES PATENT OFFICE 2,525,179

ELECTRIC RESISTOR CONTROL DEVICE

William R. Polye, River Edge, N. J., assignor to Bendix Aviation Corporation, Teterboro, N. J., a corporation of Delaware Application February 18, 1946, Serial No. 648,449

8 Claims. (Cl. 201—63)

This invention relates to control devices generally and more particularly to an evacuated tube type of time delay control device.

It is often desirable in the operation of control devices such as automatic control devices, for example, to energize one circuit in response to the energization of a second circuit and to provide a time lag of a desired length between the response of the first circuit to the energization of the second circuit. One manner of acquiring the desired time lag in the above environment is by providing, between the controlled and controlling circuits, a thermal delay coupling based on a heat exchange relation principle as shown in copending application Serial No. 562,826 filed November 10, 1944, now Patent #2,463,805, issued March 8, 1949. Although the time delay coupling there shown is well suited for most applications, it possesses one undesirable characteristic in that the time constant thereof is difficult of control so that the coupling is not adapted for application where a more rapid time constant is desired.

The present invention contemplates the provision of a new and novel coupling device having a rapid time constant adapted to operatively interconnect a controlled circuit with a controlling circuit and to provide a delay of a relatively short length of time in the response of the controlled circuit to the controlling circuit whether the controlled circuit be an A. C. or D. C. circuit or whether the controlling circuit be an A. C. or D. C. circuit. Further, the coupling device hereof is of such a character that in carrying out its intended function it develops no new and undesirable signal so that the controlled circuit when it responds does so only in accordance with the signal of the controlling circuit.

An object of the present invention, therefore, is to provide a novel coupling device of the character and for the purpose described.

Another object of the invention is to provide a novel coupling device between two or more interconnected circuits which will provide a desired time delay between the response of one circuit to another.

A further object is to provide a novel coupling device of the character described whose operating mechanism may be desirably supported within an evacuated envelope or tube.

Another object is to provide a novel thermal type time delay coupling device having a short time constant in the form of a vacuum tube.

A further object is to provide a time delay coupling device in the form of a vacuum tube embodying two bridge circuits adapted for connection to an external bridge circuit, the tube bridges comprising, respectively, two of the arms of the external bridge.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention.

In the drawings, wherein like reference characters refer to like parts throughout the several views, Figure 1 is a wiring diagram of a conventional Wheatstone bridge arrangement;

Figure 1:
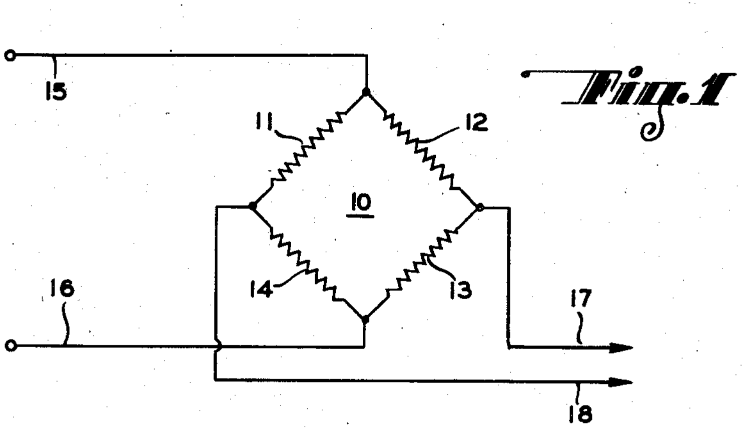

The basic unit of the novel coupling tube of the present invention constitutes an electrical resistance bridge 10, shown in Figure 1, having four arms 11, 12, 13 and 14 of equal resistance and each preferably consisting of a material having a high temperature coefficient of resistance. Leads 15 and 16 are connected to opposite corners of the bridge and function to connect the bridge with a suitable source of current supply (not shown). Leads 17 and 18 connected across the remaining corners of the bridge, on the other hand, as is well known, serve to connect the bridge with an electrical network which responds, when signal voltages are applied to leads 15 and 16, to changes in the value of any one or more of the bridge resistors.

In certain applications, it is desirable to control one circuit in accordance with the operation of a second circuit, a certain time delay, however, being required between the response of the first circuit to the operation of the second circuit. One such time delay coupling may be of the form shown in Figure 2 of the drawings wherein two arms of the bridge constituted by resistors 13 and 14 have been replaced by two auxiliary control bridges 19 and 20, bridge 19 being provided with equal resistor arms 25, 26, 27 and 28 and bridge 20 being provided with equal resistor arms 21, 22, 23 and 24. Opposite points of bridges 19 and 20 are connected by way of conductors 29, 30 and 31, 32 with a suitable signal source (not shown).

As pointed out more fully in copending application Serial No. 648,490, filed February 18, 1946, now Patent #2,487,697, issued November 8, 1949, a signal appearing at either of conductors 29, 30 or 31, 32 causes current flow through bridge 19 or 20. Because both of these bridges are of equal value, the signal flowing therein will not pass to main bridge 10 but will flow equally through the four arms of either of the auxiliary bridges. Such current flow manifests itself in a temperature change of the auxiliary bridges so that, depending upon which of the auxiliary bridges is energized, that arm of the main bridge will be subject to a temperature and, therefore, a resistance change so that the main bridge is unbalanced and current flow occurs at leads 17 and 18 in a direction dependent upon which one of the auxiliary control bridges has had a signal voltage applied thereto. It will be apparent that main bridge 10 can be a D. C. or an A. C. bridge while the auxiliary bridges may be D. C. or A. C. bridges as desired.

Inasmuch as it is extremely important for the proper operation of the time delay coupling device hereof that both of the auxiliary bridges 19 and 20 have substantially the same time constants and working characteristics, it is desirable to subject both of the control bridges to the same atmosphere so that both will equally respond to ambient temperature changes. To this end, therefore, and in accordance with the present invention, both bridges are mounted in a novel manner within an evacuated envelope so that in addition, these bridges are protected from corrosion, oxidation and other damage which might effect the resistance of the bridge arms unequally.

Figure 3:
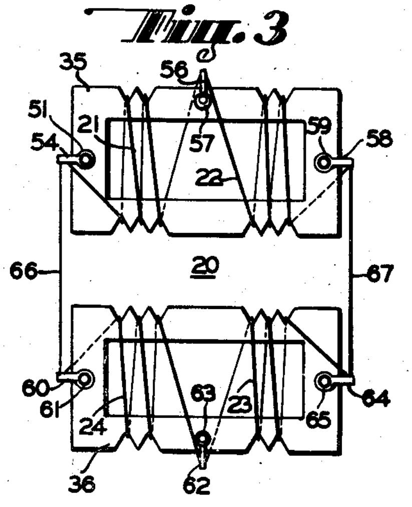
Figures 3 and 4 are detail views showing the wiring arrangement and mounting of both of the auxiliary control bridges in accordance with the present invention.
Figure 4:
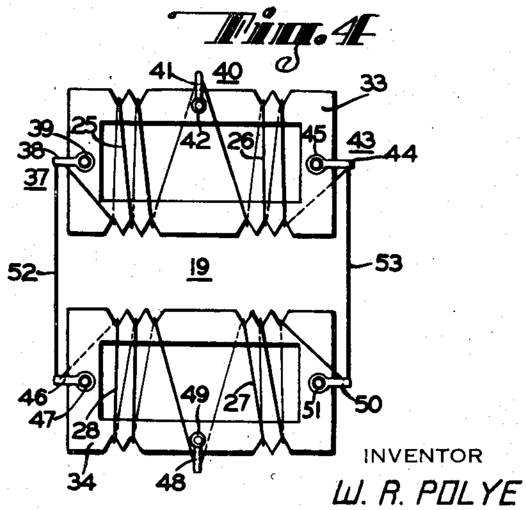

For accomplishing the foregoing desired end, the resistor arms 25, 26 and 27, 28 of auxiliary bridge 19 and resistor arms 21, 22 and 23, 24 of auxiliary bridge 20 are mounted on thin mica frames 33, 34 and 35, 36, each of the latter being cut out as shown to reduce heat capacity. As better shown in Figures 3 and 4, one end of resistor arm 25 of bridge 19 is clamped in a bent-over conductor 38 integral with a terminal 37 (Figure 5) secured to a hollow rivet 39 fastened to one end of mica frame 33. Resistor arm 25 is wound in suitable serrations about frame 33 and has its opposite end clamped within a terminal 40 comprising a conductor 41 having two bends (Figure 6) and secured to a hollow rivet 42 fastened to one side of frame 33. The second bend of conductor 41 supports one end of resistor arm 26 of bridge 19 therein which is wound about frame 33 and its opposite end is clamped within a terminal 43 which comprises a bent over conductor 44 secured to a hollow rivet 45 fastened to an opposite end of frame 33.

Resistor arm 28 of bridge 19, on the other hand, has one of its ends clamped within a terminal having a bent over conductor 46 secured to a hollow rivet 47 fastened to one end of frame 34 and is thereafter wound about frame 34 and has its opposite end fastened within one bend of a conductor terminal 48 which is secured to a hollow rivet 49 fastened to one side of frame 34.

The second bend of conductor 48 accommodates one end of resistor arm 27 of bridge 19, the resistor being wound about the frame and having its opposite end clamped within the bend of a terminal conductor 50 which is secured to a hollow rivet 51 fastened to the opposite end of frame 34.

Frame 33 and its resistor arms 25, 26 and frame 34 with its resistor arms 27 and 28 thus define bridge 19, it being noted that opposite corners of the bridge, i. e., terminal conductors 38, 46 and 44, 50 are interconnected by way of leads 52 and 53. The latter two leads constitute opposite corners of bridge 19 while terminal conductors 41 and 48 define the remaining bridge corners.

In a similar manner, one end of resistor arm 21 of bridge 20 is received within the bend of a terminal conductor 54 which is secured to a hollow rivet 51 fastened to one end of mica frame 35, the resistor being wound about frame 35 and having its opposite end clamped within one bend of a terminal conductor 56 which is secured to a hollow rivet 57 fastened to one side of the frame. The second bend of conductor 56 accommodates one end of resistor arm 22 therein, the latter being wound about frame 35 and having its opposite end clamped by a bent conductor terminal 58 which is secured to a hollow rivet 59 fastened to the opposite end of the frame.

Resistor arm 24 of bridge 20 has one of its ends clamped within bent terminal conductor 60 which is secured to a hollow rivet 61 fastened to one end of frame 36. The resistor is wound about frame 36 and has its opposite end confined within one bend of terminal conductor 62 which is secured to a hollow rivet 63 fastened to one side of the frame. The second bend of conductor 62 accommodates one end of resistor arm 23 of bridge 20, the resistor being wound about the frame and having its opposite end fastened within the bend of a terminal conductor 64 which is secured to a hollow rivet 65 fastened to the opposite end of frame 36.

Frame 35 and its resistor arms 21 and 22 and frame 36 with its resistor arms 23 and 24 thus define bridge 20, opposite corners of the bridge, i. e., terminal conductors 54, 60 and 58—64 being interconnected by way of leads 66 and 67. The latter two leads constitute opposite corners of bridge 20 while terminal conductors 56 and 62 define the remaining bridge corners.

Figures 5, 6, 7, 8:
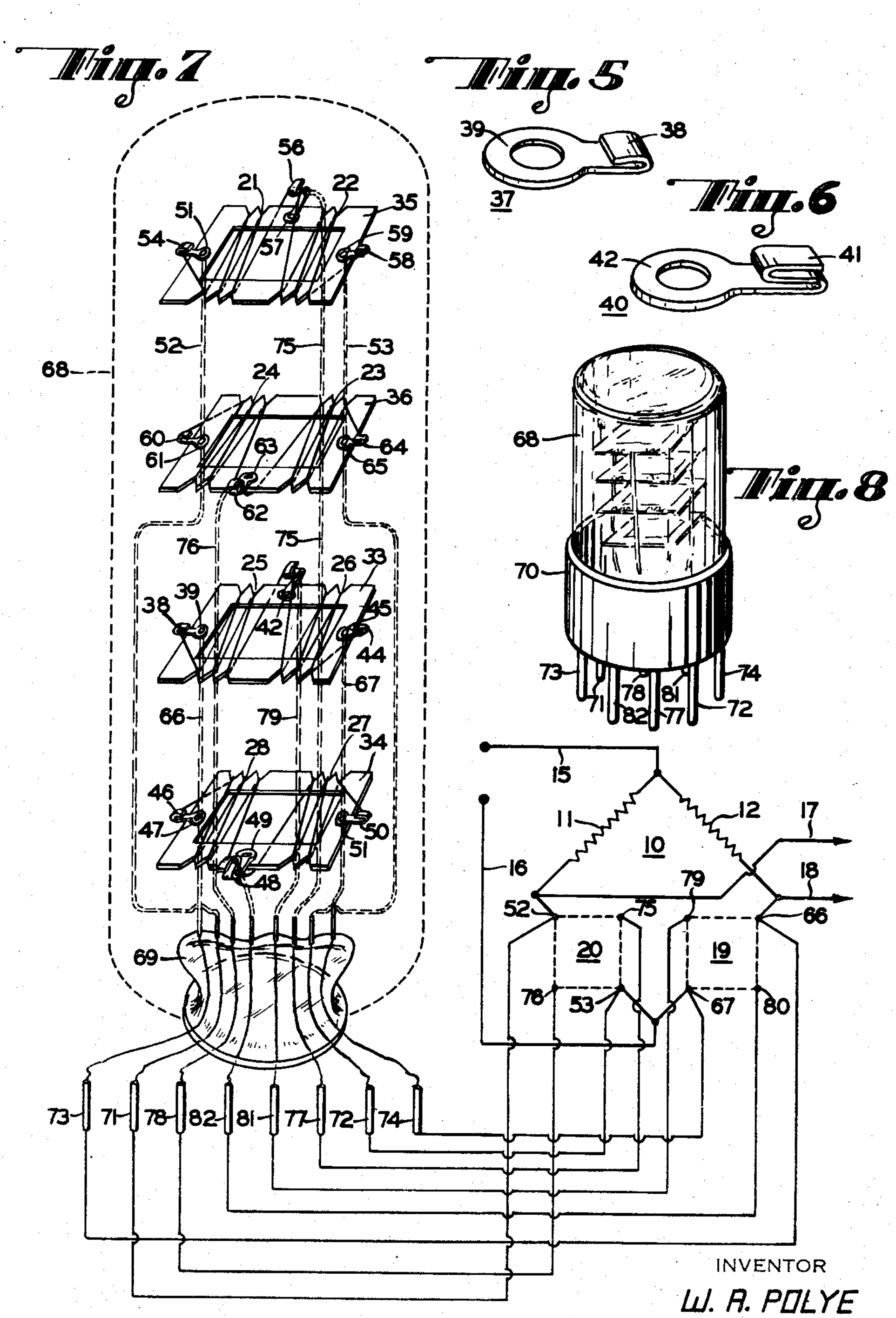
Figures 5 and 6 are detail views of the terminals utilized with the arrangement of Figures 3 and 4.
Figure 7 is a perspective view of the novel time delay coupling tube constituting the subject matter of the present invention; and, Figure 8 is a perspective view of the novel tube hereof.

As shown more clearly in Figure 7 of the drawings, frames 33, 34, 35 and 36 are arranged in spaced parallel relation within a suitable glass envelope 68 having a stem 69 sealed thereto and a suitable pronged base 70 (Figure 8) secured thereto. Frames 35 and 36 are secured together in spaced parallel relation by way of leads 52 and 53 which pass through and are fastened within hollow rivets 51, 61 and 59, 65. Leads 52 and 53, moreover, have substantially rigid extensions which pass into and out of stem 69 to a related pair of prongs 71, 72 for a purpose to presently appear.

Frames 33 and 34, on the other hand, are secured together in spaced parallel relation with each other and with frames 35 and 36 by way of leads 66 and 67 which pass through and are fastened within hollow rivets 39, 47 and 45, 51. Leads 66 and 67, further, are provided with substantially rigid extensions which pass into and out of stem 69 to a related pair of prongs 73, 74 for a purpose to likewise presently appear.

The opposite corners of bridge 20 defined by terminal conductors 56 and 62 are connected by way of substantially rigid leads 75 and 76 passing through stem 69 with prongs 77 and 78 while the opposite corners of bridge 19 defined by terminal conductors 41 and 48 are connected by way of substantially rigid leads 79 and 80 passing through stem 69 with prongs 81 and 82.

In the foregoing manner, leads 52 and 53, 75 and 76, 66 and 67, and 79 and 80 act not only as the various corners of the bridges 19 and 20 but also act as spacing and supporting elements for maintaining frames 33, 34, 35 and 36 in tandem one over the other and in spaced parallel relation with one another.

Figure 2:
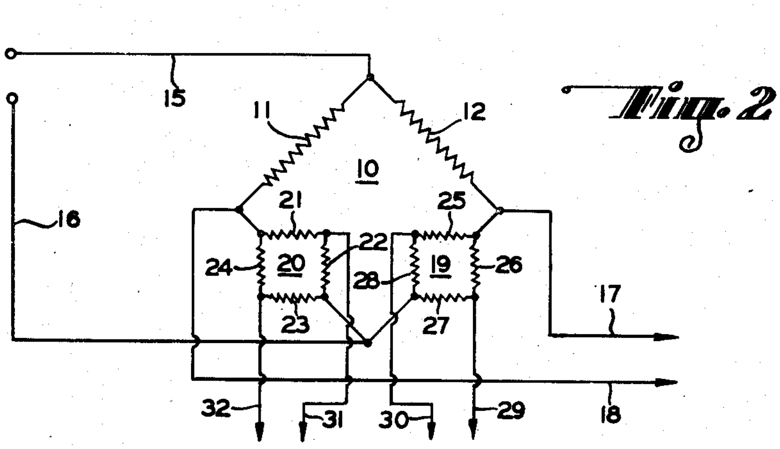
Figure 2 is a wiring diagram of the bridge circuit of Figure 1 having two arms thereof provided with auxiliary control Wheatstone bridges.

By mounting the prongs of the tube within a suitable receptacle (not shown) having connection with corners 52, 76, 53 and 75 of the arm of main bridge 10 defined by control bridge 20 and with corners 66, 79, 67 and 80 of the second arm of main bridge 10 defined by control bridge 19 the two control bridges, though essentially comprising a vacuum tube, will be electrically connected with the two arms of the main bridge as shown by the connection of control bridges 19 and 20 to the main bridge in Figure 2.

By applying a signal voltage across prongs 81 and 82 of the tube, current flows in conductors 79 and 80 and, therefore, within resistor arms 25, 26, 27 and 28 carried by frames 33 and 34 of control bridge 19 to raise the temperature and therefore the resistance of the arm of the main bridge incorporating control bridge 19 whereupon the main bridge is unbalanced and current flows in one direction at its output leads 17 and 18. On the other hand, by applying a signal voltage across prongs 77 and 78 of the tube, current flows in conductors 75 and 76 and, therefore, within resistor arms 21, 22, 23 and 24 carried by frames 35 and 36 of control bridge 20 to raise the temperature and, hence, the resistance of the adjoining arm of the main bridge whereupon the latter is unbalanced and current flows in an opposite direction at the output leads 17 and 18.

There is thus provided a novel time delay coupling in the nature of a main bridge circuit having two of its adjoining arms formed of auxiliary control bridges, the latter being arranged as a novel type of vacuum tube, each of the control bridges being adapted for response to a signal voltage to vary the resistance of one or the other of the main bridge arms and thus unbalance the main bridge and produce current flow therethrough. With the arrangement described, an A. C. main bridge may be controlled by a D. C. signal applied to one or the other of the auxiliary control bridges located within the tube or a D. C. main bridge may be controlled by an A. C. signal applied to one or the other of the auxiliary control bridges.

The arrangement above described, moreover, is more desirable than heat exchange devices heretofore known inasmuch as the former have a more rapid time constant since their operation does not rely on the heat exchange principle.

Although but one embodiment of the invention has been illustrated and described in detail, it is to be expressly understood that the invention is not limited thereto. Various changes can be made in the design and the arrangement of the parts without departing from the spirit and scope of the invention as the same will now be understood by those skilled in the art. For example, an evacuated vessel has been described but it could as well be a sealed tube provided with some suitable inert gas. Moreover, instead of glass the tube could be formed of metal. For a definition of the limits of the invention, reference will be had primarily to the appended claims.

I claim:

1. A time delay device comprising a sealed enclosure, a pair of insulating frames within said enclosure, conducting means supporting said frames in spaced relation within said enclosure, a pair of resistor elements carried by one of said frames, a pair of resistor elements carried by the other of said frames; the ends of said resistor elements being connected to the supporting means of their respective frames, and terminals carried by said enclosure and connected to said supporting means for connecting said resistor elements into an electric circuit.

2. A time delay device comprising an evacuated envelope, a pair of insulating frames within said envelope and having serrations formed on opposite sides thereof, conducting means supporting said frames within said envelope in spaced parallel relation, a pair of resistor elements wound about the serrations of one of said frames, a pair of resistor elements wound about the serrations of the other of said frames; the ends of said resistor elements being connected to the supporting means of their respective frames, and terminals carried by said envelope and connected to said supporting means for connecting said resistor elements into an electric circuit.

3. A time delay device comprising an evacuated envelope, a pair of insulating frames within said envelope and having serrations formed on opposite sides thereof, conducting means supporting said frames within said envelope in tandem and in spaced parallel relation, a pair of resistor elements wound about the serrations of one of said frames, a pair of resistor elements wound about the serrations of the other of said frames; the ends of said resistor elements being connected to the supporting means of their respective frames, and terminals carried by said envelope and connected to said supporting means for connecting said resistor elements into an electric circuit.

4. A time delay device comprising an evacuated envelope, a pair of insulating frames within said envelope, a pair of standards supporting said frames in spaced relation within said envelope, and a standard for each of said frames for supporting said frames in parallel relationship, a pair of resistor elements carried by one of said frames, a pair of resistor elements carried by the other of said frames, the ends of said resistor elements being connected to the standards supporting their respective frames, and terminals carried by said envelope connected to said standards for connecting said resistor elements into an electric circuit.

5. A time delay device comprising an evacuated envelope, a pair of insulating frames within said envelope, a pair of standards supporting said frames in spaced tandem relation within said envelope, and a standard for each of said frames for supporting said frames in parallel relationship, a pair of resistor elements carried by one of said frames, a pair of resistor elements carried by the other of said frames, the ends of said resistor elements being connected to the standards supporting their respective frames, and terminals carried by said envelope connected to said standards for connecting said resistor elements into an electric circuit.

6. A time delay device comprising an evacuated envelope, a pair of insulating frames within said envelope and having serrations formed on opposite sides thereof, a pair of standards supporting said frames in spaced tandem relation within said envelope, and a standard for each of said frames for supporting said frames in parallel relationship, a pair of resistor elements wound about the serrations of one of said frames, a pair of resistor elements wound about the serrations of the other of said frames, one end of each resistor element on a frame being connected to a tandem supporting standard of its respective frame, the other ends of said elements being connected to the parallel supporting standard of their respective frames, and terminals carried by said envelope connected to said standards for connecting said resistor elements into an electric circuit.

7. In a device of the kind described, a sealed enclosure, a plurality of flat mica sheets positioned within said enclosure, conducting means supporting said sheets in spaced relation within said enclosure, a pair of resistor elements carried by each of said sheets and the ends of said resistor elements being connected to the supporting means of their respective sheets.

8. In a device of the kind described, a sealed enclosure, a plurality of flat mica sheets positioned within said enclosure, conducting means supporting said sheets in spaced relation within said enclosure, a pair of resistor elements carried by each of said sheets, the ends of said resistor elements being connected to the supporting means of their respective sheets, and terminals at one end of said enclosure connected to said supporting means for connecting said resistor elements into an electric circuit.

WILLIAM R. POLYE.

REFERENCES CITED

The following references are of record in the file of this patent:

UNITED STATES PATENTS

| Number | Name | Date |
|---|---|---|
| 2,001,498 | Meyer et al. | May 14, 1935 |

FOREIGN PATENTS

| Number | Country | Date |
|---|---|---|
| 377,503 | Great Britain | July 28, 1932 |